United States Patent [19]

Murphy

[11] 4,058,351
[45] Nov. 15, 1977

[54] MASTER LINK ASSEMBLY HAVING TWO-PIECE LINKS

[75] Inventor: Bernard J. Murphy, Springfield, Ill.

[73] Assignee: Fiat-Allis Construction Machinery, Inc., Deerfield, Ill.

[21] Appl. No.: 692,592

[22] Filed: June 3, 1976

Related U.S. Application Data

[63] Continuation of Ser. No. 537,950, Jan. 2, 1975, abandoned.

[51] Int. Cl.$^2$ ............................................. B62D 55/28
[52] U.S. Cl. .................................... 305/54; 305/58 R
[58] Field of Search ......................... 305/58 R, 54, 42; 74/258

[56] References Cited

U.S. PATENT DOCUMENTS

| | | | |
|---|---|---|---|
| 2,882,102 | 4/1959 | Rund | 305/58 X |
| 3,357,750 | 12/1967 | Reynolds et al. | 305/42 X |
| 3,659,112 | 4/1972 | Stedman | 305/58 |
| 3,851,932 | 12/1974 | Story et al. | 305/58 |

Primary Examiner—Robert B. Reeves
Assistant Examiner—John P. Shannon
Attorney, Agent, or Firm—Thomas F. Kirby; Robert A. Brown; Harvey W. Rockwell

[57] ABSTRACT

A master link assembly in a continuous flexible track assembly for a crawler tractor comprises two laterally spaced apart (left and right) parallel master links and each master link comprises two overlapping half-links held in alignment and mechanically secured together in fixed relationship by track shoe capscrews which extend through holes in a master link track shoe which overlies both half-links and screw into tapped capscrew holes in the half-links.

7 Claims, 8 Drawing Figures

MASTER LINK ASSEMBLY HAVING TWO-PIECE LINKS

REFERENCE TO RELATED CO-PENDING APPLICATION

This is a continuation application from U.S. Ser. No. 537,950, filed Jan. 2, 1975, now abandoned.

BACKGROUND OF THE INVENTION

1. Field of Use

This invention relates generally to crawler tractor track assemblies and particularly to master links therefor.

2. Description of the Prior Art

A track assembly for a crawler tractor typically comprises a plurality of articulately connected link assemblies, with a track shoe attached to each and with adjacent link assemblies being connected together by pins and bushings. Normally, at least one link assembly is constructed to serve as a separable or detachable master link assembly to enable the track assembly to be mounted on or removed from the tractor. The prior art teaches a wide variety of such master link assemblies, and U.S. Pat. No. 2,882,102 teaches a master link assembly comprising two laterally spaced apart (right and left) links and each link comprises two separable parts having mating faces and aligned holes and detachable means extending through the aligned holes to directly connect the two parts of the link together.

SUMMARY OF THE PRESENT INVENTION

In accordance with the present invention there is provided a continuous flexible articulated track assembly for a crawler tractor which comprises a plurality of interconnected link assemblies. Each link assembly comprises a pair of laterally spaced apart (right and left) parallel links which are interconnected at one end by a hollow cylindrical transverse track bushing and which are interconnected at the other end by a cylindrical transverse track pin which extends through the track bushing of the next adjacent link assembly. The ends of the track bushing and the ends of the track pin are press-fitted in holes in the links. The track pin is relatively oscillatable with respect to the track bushing wherein it is inserted so as to reduce friction and facilitate assembly and disassembly of the track. One such link assembly serves as a master link assembly which enables the track assembly to be broken so that it can be mounted on or removed from the tractor. The master link assembly comprises two laterally spaced apart (left and right) parallel master links, a master track shoe, and track shoe capscrews. Each master link comprises two overlapping half-links and each half-link has an aperture for receiving (in press-fit) either the end of a hollow cylindrical bushing or a cylindrical track pin. The overlapping half-links are mechanically secured together in fixed relationship by the track shoe and by the track shoe capscrews, each of which extends through a hole in the track shoe which overlies both half-links and screws into a tapped capscrew hole extending inwardly from the edge of a half-link. The master track shoe and the capscrew therefor bear the principal loads. By placing capscrews along each half-link, the design is more stable. In addition, a master link assembly in accordance with the invention employs the same type and size of hollow cylindrical track bushing, cylindrical track pin, track shoe, except the number of track shoe bolt holes as are used in the regular link assemblies of the track, instead of special parts, thereby effecting cost savings in manufacture and assembly. The wear surface of each half-link has a continuous uniform width which is an aid in heat treating. The track roller has no joint to roll over because the joint is parallel to direction of track assembly motion. Other advantages of the invention will hereinafter appear.

DRAWINGS

DESCRIPTION OF A PREFERRED EMBODIMENT

Figure 1:
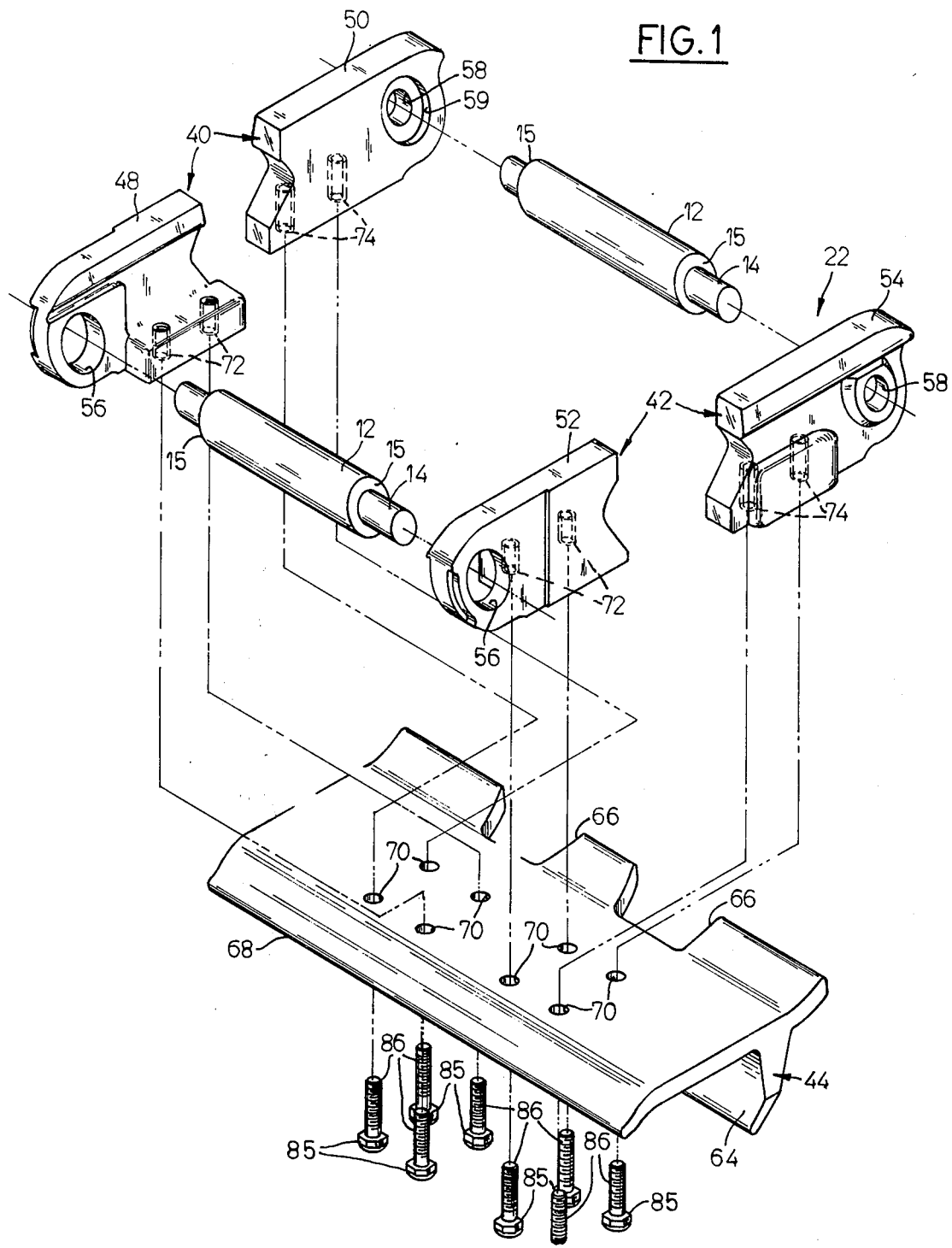
FIG. 1 is an exploded view of a master link assembly for a tractor track assembly in accordance with the invention.
Figure 2:
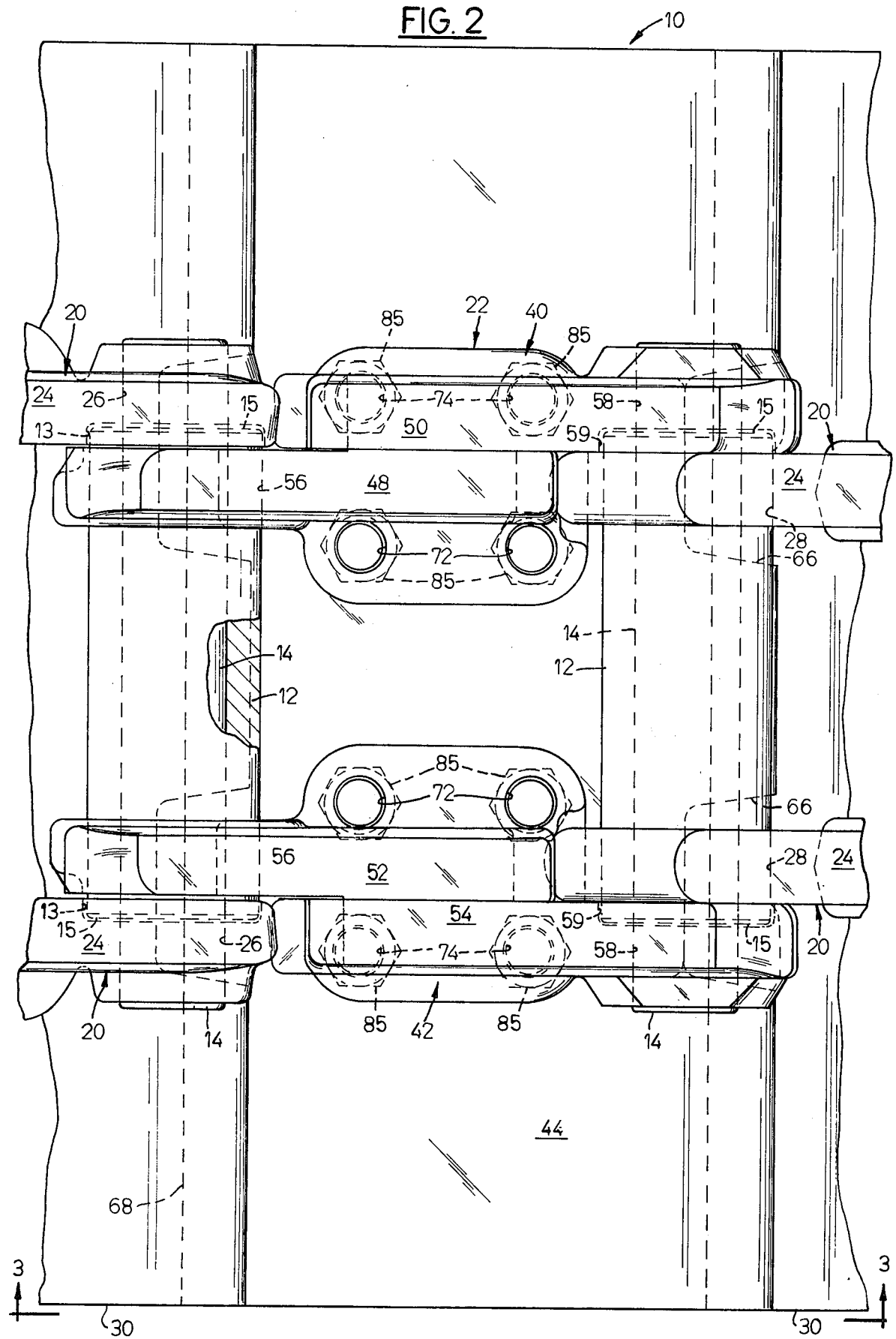
FIG. 2 is a plan view of the master link assembly shown in FIG. 1 and shows the inside thereof, namely, that side which would engage the track rollers of a tractor.
Figure 3:
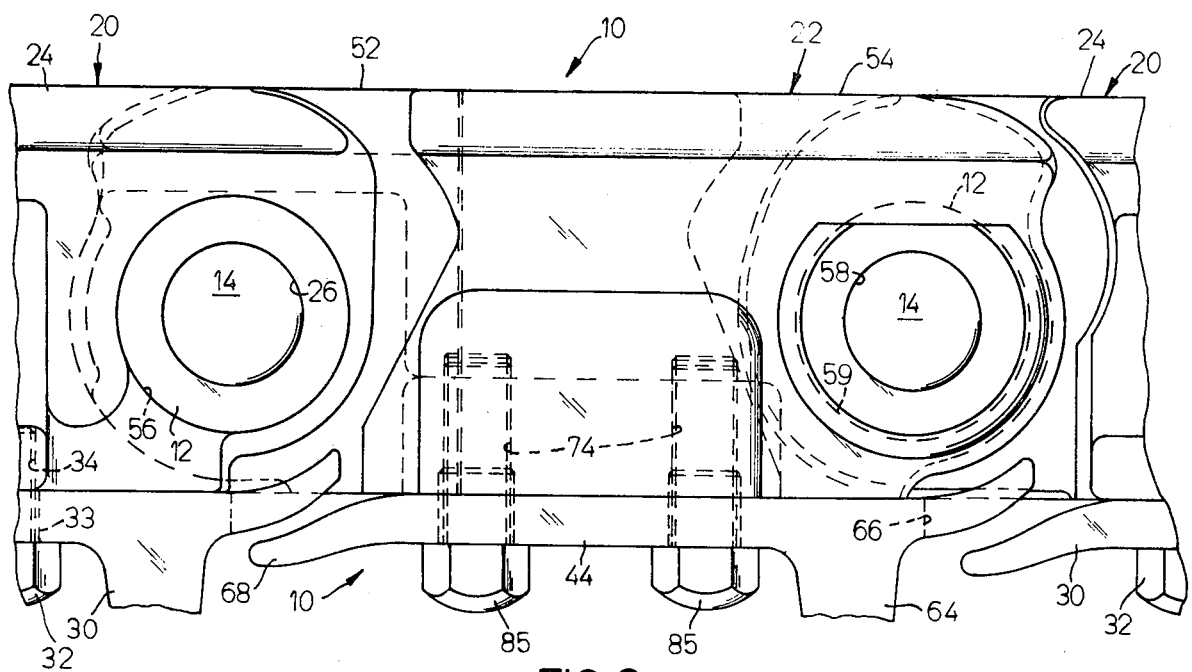
FIG. 3 is a side view of the master link assembly shown in FIGS. 1 and 2.

Referring to FIGS. 1, 2 and 3, there is shown a portion of a continuous flexible articulated track assembly 10 in accordance with the invention for use, for example, on a crawler tractor. Track assembly 10 comprises a plurality of regular interconnected track link assemblies such as 20 and one master link assembly or coupling link assembly 22 connected to and between an adjacent pair or regular track link assemblies 20. Master link assembly 22, hereinafter described in detail, enables track assembly 10 to be broken or separated so that it can be mounted on or removed from the tractor. Each regular track link assembly 20 comprises a pair of laterally spaced apart (right and left) parallel one-piece links 24 which are interconnected at one end by a hollow cylindrical transverse track bushing 12 and which are interconnected at the other end by a cylindrical transverse track pin 14 which extends through the hollow track bushing 12 of the next adjacent regular link assembly 20. The ends of the track bushing 12 and the ends of the track pin 14 are press-fitted in holes 28 and 26, respectively, in the links 24. The track bushings 12 and track pins 14 are arranged with their axes parallel to each other and normal to the direction of track travel. Each track pin 14 is relatively oscillatable with respect to the track bushing 12 wherein it is disposed so as to reduce friction and facilitate assembly and disassembly of track assembly 10. The opposite ends of the bushings 12 provide shoulders or surfaces 15 which properly space the links 24 associated with the track pin 14.

As FIGS. 2 and 3 show, each regular link assembly 20 comprises two laterally spaced apart parallel one-piece (right and left) links 24 which are identical to each other. Each link 24 comprises a bore 28 at one end for accommodating the end of a bushing 12 in a press fit and a bore 26 at its other end for accommodating the end of a track pin 14 in a press fit. Bore 26 is widened as at 13 to accommodate an outwardly projecting end portion of a bushing 12. Each regular link assembly 20 is provided with a track shoe 30 which is secured thereto by track shoe bolts or capscrews 32 which extend through holes 33 in the track shoe and screw into threaded holes 34 extending into a link 24 inwardly from an edge thereof.

Master link assembly 22, which is connected to and between an adjacent pair of regular track link assemblies 20, comprises two laterally spaced apart (right and left) parallel master links 40 and 42, a master track shoe 44, and a plurality of (eight) shoe bolts or capscrews hereinafter particularly identified and described. Master link 40 comprises two half-links 48 and 50 and master link 42 comprises two half-links 52 and 54. The innermost half-links 48 and 52 are similar but mirror images of each other and the outermost half-links 50 and 54 also are similar but mirror images of each other; therefore, four distinct types of half-links need to be fabricated.

The more closely spaced half-links 48 and 52 are each provided with a bore 56 for accommodating the end of a hollow cylindrical track bushing 12 in a press fit. The more widely spaced half-links 50 and 52 are each provided with a bore 58 for accommodating the end of a cylindrical track pin 14 in a press fit. Bore 58 is widened as at 59 to accommodate an outwardly projecting end portion of a bushing 12.

Each pair of overlapping half-links forming the master links 40 and 42 are mechanically secured together in fixed relationship by the master link track shoe 44 and the track shoe bolts or capscrews. As FIG. 1 best shows, track shoe 44 takes the form of a generally flat rigid plate having a ground-engaging lug 64 extending outwardly from the ground-engaging or outer surface of the plate. Track shoe 44 is further provided with a pair of notches, indentations or cutouts 66 in one edge, which edge is transverse to the direction of track travel. The cutouts 66 are adapted to accommodate the links 24 of an adjacent track link assembly. Track shoe 44 is also provided with a projecting edge 68 opposite the said one edge. The forward and rear edges on track shoe 44 overlap the adjacent edges of the adjacent regular track shoes 30. Thus, track 10 presents a generally flat, uninterrupted but articulated ground engaging surface, as FIG. 2 best shows. It is to be understood that the regular track shoes 30 and master track shoe 44 are identical in general configuration, with the number and location of capscrew holes therein being the only difference.

FIG. 1 further shows that master track shoe 44 is provided with an arrangement of bolt accommodating holes 70. Four holes 70 are grouped near each lateral edge of shoe 44 and two holes in each group are arranged in tandem so as to overlie the edge of each of the two half-links forming a link 40 or 42.

Figure 4:
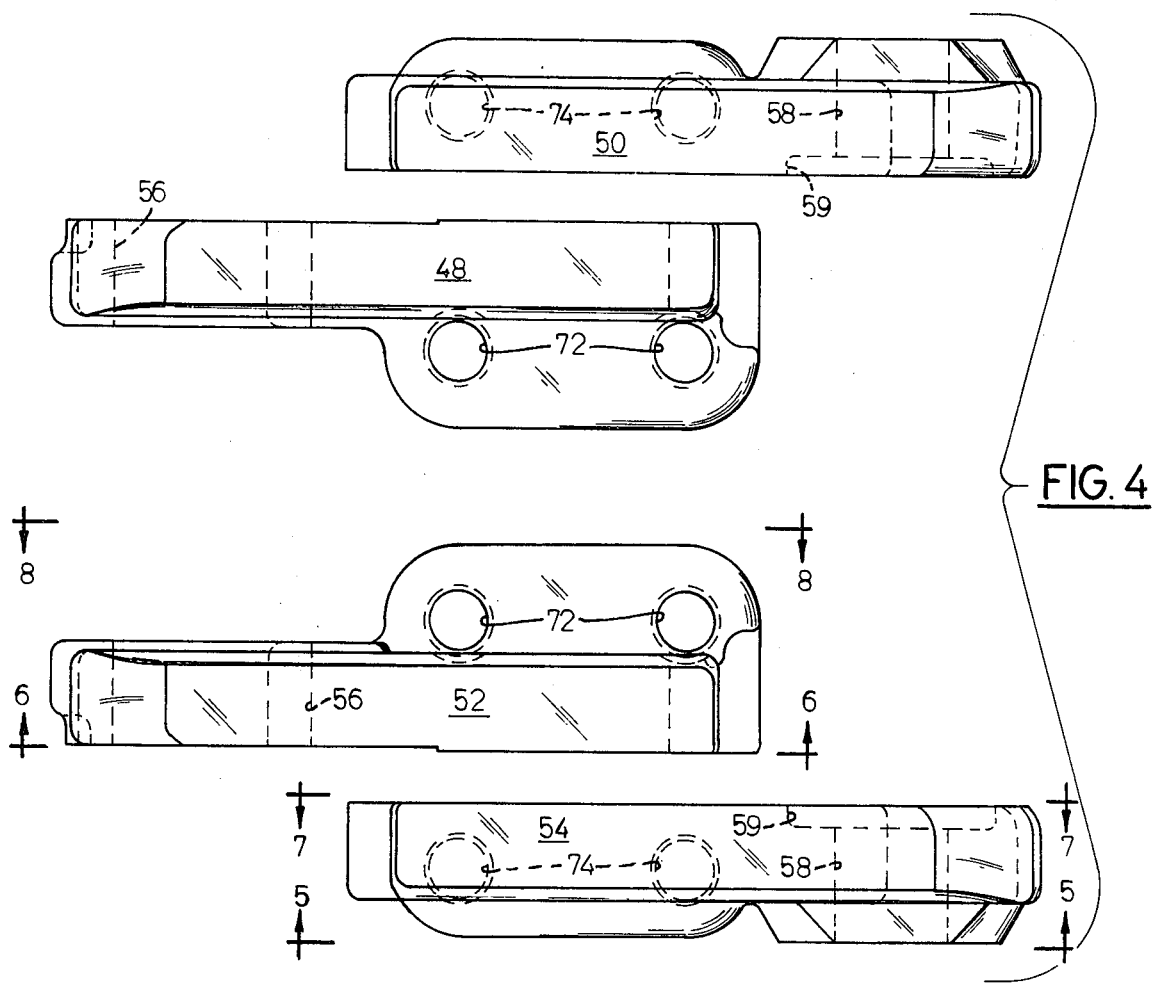
FIG. 4 is an exploded plan view of a portion of the master link assembly taken in the same direction as FIG. 2 and showing two overlapping half-links forming one of the master links.
Figure 5:
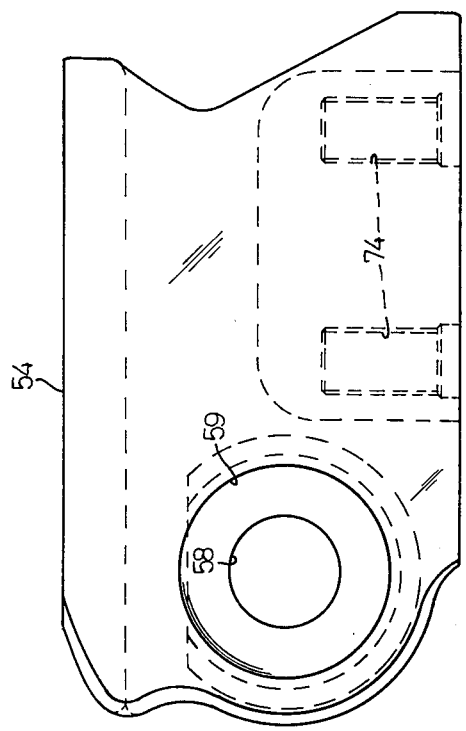
FIG. 5 is a view of one side of one half-link shown in FIG. 4.
Figure 6:
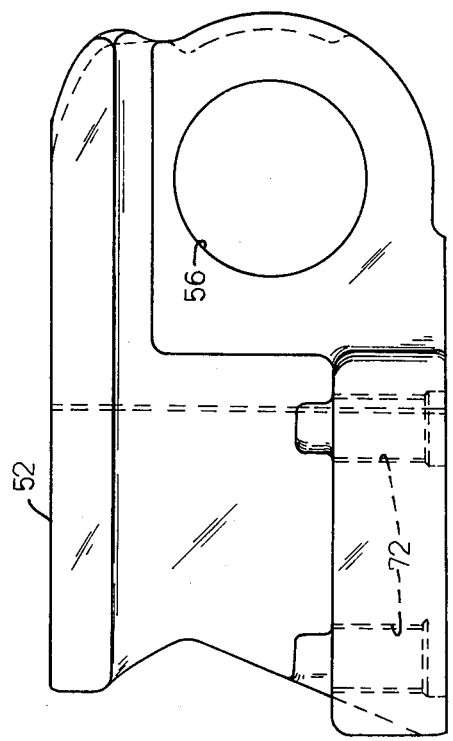
FIG. 6 is a view of one side of the other half-link shown in FIG. 4.

When track shoe 44 is arranged to properly overlie the two half-links forming a link, each hole 70 is aligned or in registry with a bolt receiving hole extending inwardly into a half-link from an edge thereof. As FIGS. 4, 5 and 6 best show, half-link 52 of link 42 is provided with a pair of bolt or screw receiving holes 72. Half-link 54 of link 42 is also provided with a pair of bolt or screw receiving holes 74.

Figure 7:
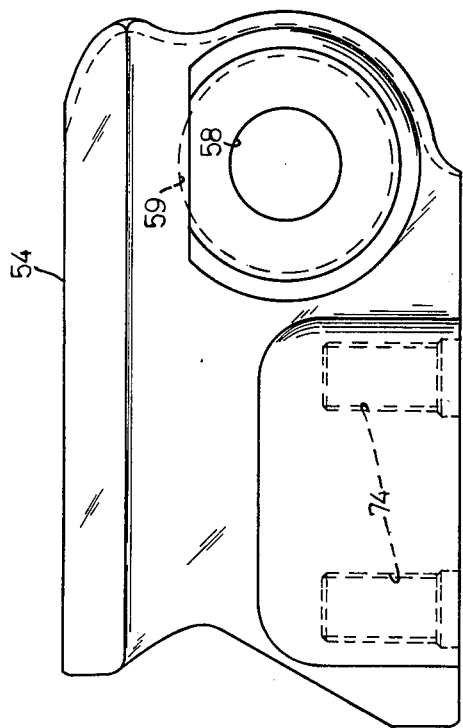
FIG. 7 is a view of the opposite side of the one half-link shown in FIG. 5.
Figure 8:
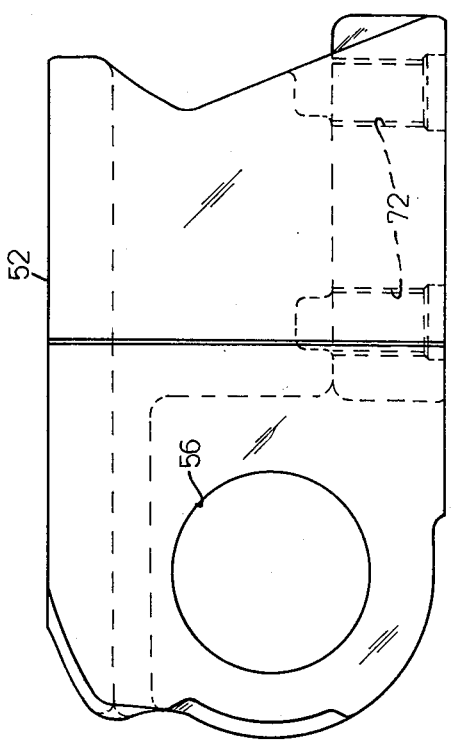
FIG. 8 is a view of the opposite side of the other half-link shown in FIG. 6.

As FIG. 2 makes clear, the half-links 48 and 50 forming link 40 are also provided with holes 72 and 74, respectively. When the half-links 52 and 54 are overlapped, a hole 72 in one half-link is adjacent a hole 74 in the associated half-link. The holes 72 and 74 are threaded for substantially their entire length. The holes 72 and 74 are adapted to accommodate shoe bolts or capscrews of the same type. For example, as FIGS. 1 and 7 show, each hole 72 or 74 is adapted to accommodate a shoe bolt or capscrew such as 85 having a fully threaded shank 86.

Master link assembly 22 is assembled in the following manner. Referring to FIG. 2, assume that the right hand regular link 20 has been previously assembled and right hand bushing 12 is inserted (press-fitted) through the bores 28 in the links 24 of the right hand regular link 30. The right hand pin 14 is then inserted through the axial bore or hole in hollow right hand bushing 12. It may also be assumed that the left hand bushing 12 was previously press-fitted through the bores 56 in the half-links 48 and 52 during initial assembly of track 10. Also, assume that left hand pin 14 is inserted in left hand bushing 12 and that links 24 are in place thereon.

When right hand pin 14 is properly positioned, the half-links 50 and 54 are placed on the ends thereof. Then, each pair of half-links forming a master link 40 or 42 are swung into overlapping aligned relationship. When both master links 40 and 42 are so aligned, the master track show 44 is placed so as to overlie both master links 40 and 42 and the pair of half-links comprising each master link. Track shoe 44 is then adjusted so that each hole 70 registers with an appropriate one of the holes 72 or 74 in the half-links, whereupon the shoe bolts or capscrews 85 are installed and tightened. As hereinbefore explained, each capscrew 85 extends through a hole 70 in the master track shoe 44 and screws into a tapped hole 72 or 74, respectively, in a half-link. The master link assembly 22 is thus fully assembled and the crawler track 10 is continuous.

The use of two capscrews 85 in each half-link provides a fail safe connection should one of the capscrews break when the track is in motion. In particular, the remaining capscrew 85 would prevent relative longitudinal movement of the half-links. The master track shoe 44, the half-links and the shoe bolts or capscrews 85 bear the principal loads. By placing the capscrews 85 along each half-link, the design is more stable. A master link assembly 22 in accordance with the invention employs the same type and size of track bushings, track pins and track shoes as are employed in both the regular link assembly and the master link assembly. The wear surface of each half-link has a continuous uniform width which is an aid in heat treating. The track rollers 12 have no joint to roll over because the joint is parallel to direction of track motion.

I claim:

1. In a crawler track assembly: a plurality of track link assemblies arranged in a longitudinal direction, each track link assembly comprising at least one link and connecting means for articulately connecting adjacent track link assemblies, one of said track link assemblies being a master link assembly and comprising: at least one master link comprising a pair of overlapping half-links arranged in side-by-side relationship, each half-link being articulately connected by connecting means to an adjacent track link assembly, a master track shoe overlying and confronting an edge of each half-link in said pair of half-links, each half-link having a pair of longitudinally spaced apart capscrew holes extending inwardly from said edge and in registry with capscrew holes in said master track shoe, and capscrews for securing said master track shoe to said pair of half-links and connecting said pair of half-links in fixed relationship to each other and to said master track shoe, each capscrew being disposed in a capscrew hole in said master track shoe and a registering capscrew hole in a half-link, said capscrews and said master track shoe being the sole connecting means between each pair of overlapping half-links.

2. In a crawler track assembly: a plurality of track link assemblies arranged in a longitudinal direction, each track link assembly comprising at least one link and connecting means for articulately connecting adjacent track link assemblies, one of said track link assemblies being a master link assembly and comprising a pair of laterally spaced apart master links, each master link comprising a pair of overlapping half-links arranged in side-by-side relationship, a master track shoe overlying said master links and confronting an edge of each half-link in each said pair of half-links, said master track shoe comprising a plurality of capscrew holes, each half-link having a pair of longitudinally spaced apart capscrew holes extending inwardly from said edge and in registry with capscrew holes in said master track shoe, and capscrews for securing said master track shoe to said pair of master links and each pair of half-links and connecting each pair of half-links in fixed relationship to each other and to said master track shoe, each capscrew being disposed in a capscrew hole in said master track shoe and a registering capscrew hole in a half-link, said capscrews and said master track shoe being the sole connecting means between each pair of overlapping half-links.

3. In a master link assembly for a crawler track assembly: at least one pair of separable half-links disposed in overlapping side-by-side relationship to provide a link, each half-link being provided with a pair of longitudinally spaced apart capscrew holes extending inwardly from an edge thereof, a master track shoe, a plurality of track shoe capscrews engageable with said master track shoe and the capscrew holes in said half-links for releasably securing said master track shoe to each of said half-links against the said edge thereof to prevent longitudinal and lateral relative movement of said half-links, said capscrews and said master track shoe being the sole connecting means between each pair of overlapping half-links.

4. In a master link assembly for a crawler track assembly: a pair of laterally spaced apart master links, each master link comprising a pair of overlapping half-links arranged in side-by-side relationship, each half-link being provided with a track bushing receiving hole, each half-link being further provided with a pair of longitudinally spaced apart threaded track shoe capscrew-receiving holes extending thereinto from an edge thereof, a master track shoe overlying said pair of master links and confronting said edge of each half-link, said master track shoe being provided with a plurality of track shoe capscrew holes therethrough, each track shoe capscrew hole in said master track shoe being in registry with one threaded track shoe capscrew hole in a half-link, and a plurality of track shoe capscrews for securing said master track shoe to said master links and for connecting the overlapping half-links in each pair of master links in fixed relationship to each other and to said master track shoe, each track shoe capscrew extending through a track shoe capscrew hole in said master track shoe and into a registering track shoe capscrew-receiving hole in a half-link, said capscrews and said master track shoe being the sole connecting means between each pair of overlapping half-links.

5. In a master link assembly for a crawler track assembly: a pair of laterally spaced apart master links, each master link comprising a pair of overlapping half-links, each half-link being provided with a track bushing receiving hole, each half-link being further provided with a pair of threaded track shoe capscrew-receiving holes extending thereinto, a master track shoe overlying said pair of master links and provided with a plurality of track shoe capscrew holes therethrough, each track shoe capscrew hole in said master track shoe being in registry with one threaded track shoe capscrew hole in a half-link, and a plurality of track shoe capscrews for securing said master track shoe to said master links and for connecting the overlapping half-links in each pair of master links in fixed relationship to each other and to said master track shoe, each track shoe capscrew extending through a track shoe capscrew hole in said master track shoe and into a registering track shoe capscrew-receiving hole in a half-link, said capscrews and said master track shoe being the sole connecting means between each pair of overlapping half-links.

6. In a crawler track assembly: a plurality of articulately connected track link assemblies arranged in a longitudinal direction, each track link assembly comprising a pair of laterally spaced apart links, a hollow cylindrical track bushing, and a cylindrical track pin disposed within said track bushing, each link being provided with a bushing-receiving hole near one end wherein an end of said track bushing is inserted, each link being provided with a track pin-receiving hole near its other end wherein an end of said track pin is inserted, one of said track link assemblies being a master link assembly and comprising: a pair of laterally spaced apart master links, each master link comprising a pair of overlapping half-links arranged in side-by-side relationship, a master track shoe overlying said master links and confronting an edge of each half-link in each said pair of half-links, said master track shoe comprising a plurality of capscrew holes, each half-link having a pair of longitudinally spaced apart capscrew holes extending inwardly from said edge and in registry with capscrew holes in said master track shoe, and capscrews for securing said master track shoe to said pair of master links and each pair of half-links and connecting each pair of half-links in fixed relationship to each other and to said master track shoe, each capscrew being disposed in a capscrew hole in said master track shoe and a registering capscrew hole in a half-link, said capscrews and said master track shoe being the sole connecting means between each pair of overlapping half-links.

7. A crawler track assembly according to claim 6 wherein the half-links in each said pair of half-links comprise flat uninterrupted confronting surfaces.

* * * * *